US009256457B1

(12) United States Patent
Leske et al.

(10) Patent No.: US 9,256,457 B1
(45) Date of Patent: Feb. 9, 2016

(54) INTERACTIVE RESPONSE SYSTEM FOR HOSTED SERVICES

(75) Inventors: Matthew John Leske, Stockholm (SE); Jarkko Oikarinen, Upplands-Väsby (SE); Tomas Lundqvist, Segeltorp (SE)

(73) Assignee: Google Inc., Mountain View, CA (US)

( * ) Notice: Subject to any disclaimer, the term of this patent is extended or adjusted under 35 U.S.C. 154(b) by 888 days.

(21) Appl. No.: 13/433,221

(22) Filed: Mar. 28, 2012

(51) Int. Cl.
*G06F 15/16* (2006.01)
*G06F 9/46* (2006.01)

(52) U.S. Cl.
CPC ........................................ *G06F 9/46* (2013.01)

(58) Field of Classification Search
CPC ................................ G06F 9/4448; G06F 9/46
USPC ................................................. 709/200, 205
See application file for complete search history.

(56) References Cited

U.S. PATENT DOCUMENTS

| | | | | |
|---|---|---|---|---|
| 7,127,394 B2* | 10/2006 | Strong | ................ | G10L 15/1822 704/255 |
| 8,060,366 B1 | 11/2011 | Maganti et al. | | |
| 8,938,669 B1* | 1/2015 | Cohen | ..................... | G06F 17/24 709/204 |
| 2004/0153310 A1* | 8/2004 | Beck | ...................... | G06Q 30/08 704/10 |
| 2005/0034079 A1* | 2/2005 | Gunasekar | ............ | G06F 17/289 715/753 |
| 2005/0259803 A1* | 11/2005 | Khartabil | ............... | H04M 3/564 379/202.01 |
| 2006/0036590 A1* | 2/2006 | Kouchri | ................ | G06F 17/248 |
| 2006/0050658 A1 | 3/2006 | Shaffer et al. | | |
| 2007/0153091 A1 | 7/2007 | Watlington et al. | | |
| 2007/0172044 A1* | 7/2007 | Nguyen | .............. | H04L 12/1818 379/202.01 |
| 2007/0276908 A1* | 11/2007 | Asthana | .............. | H04L 12/1822 709/204 |
| 2008/0037749 A1* | 2/2008 | Metzger | .................. | H04M 3/56 379/202.01 |
| 2008/0065446 A1* | 3/2008 | Haveliwala | ........... | G06F 9/4448 705/7.12 |
| 2008/0274739 A1* | 11/2008 | Wu | ..................... | H04L 65/1073 455/435.1 |
| 2009/0006076 A1* | 1/2009 | Jindal | ................... | G06F 17/289 704/3 |

(Continued)

FOREIGN PATENT DOCUMENTS

DE 102011109853 A1 * 2/2013 ........... G06Q 10/109

OTHER PUBLICATIONS

"Metasphere Conference Server", Metaswitch Networks, 2011, retrieved from <http://www.metaswitch.com/sites/default/files/Metaswitch-Metasphere-Conference-Server-R1.pdf>.

(Continued)

*Primary Examiner* — Anthony Mejia
(74) *Attorney, Agent, or Firm* — McDermott Will & Emery LLP

(57) ABSTRACT

A system for providing an interactive response system for hosted services may include a processor and a memory. The processor may facilitate steps of receiving data streams from participant devices, such as devices participating in a multimedia conference, and transmitting, in response to receiving the data streams from the participant devices, the data streams to the other of the participant devices. The steps may further include receiving, from one of the participant devices, a request to initiate communication with an invitee device, processing the data streams to determine a language associated with the data streams, and providing, to the invitee device, a communication in the determined language. The communication provided to the invitee device may be an initial communication of an interactive response system, such as an interactive voice response system or an interactive messaging response system.

20 Claims, 5 Drawing Sheets

(56) References Cited

U.S. PATENT DOCUMENTS

| | | | | |
|---|---|---|---|---|
| 2009/0025062 | A1* | 1/2009 | Gustave | G06F 21/33 726/4 |
| 2009/0111438 | A1* | 4/2009 | Chan | H04Q 9/00 455/414.2 |
| 2009/0210491 | A1* | 8/2009 | Thakkar | H04L 12/1822 709/204 |
| 2010/0061538 | A1* | 3/2010 | Coleman | H04L 12/1818 379/202.01 |
| 2010/0185434 | A1* | 7/2010 | Burvall | G06F 17/289 704/3 |
| 2011/0246172 | A1* | 10/2011 | Liberman | H04N 7/152 704/2 |
| 2011/0249077 | A1 | 10/2011 | Abuan et al. | |
| 2011/0249079 | A1* | 10/2011 | Santamaria | H04M 7/0057 348/14.02 |

OTHER PUBLICATIONS

"User Guide", Blackberry Wireless Headset HS-700, last viewed Mar. 30, 2012, retrieved from <http://docs.blackberry.com/en/smartphone_users/deliverables/19345/BlackBerry_Wireless_Headset_HS-700-User_Guide--1035096-0819052837-001-US.pdf>.

"Dial-Out Features and Voice Prompt Languages", Cisco Unified MeetingPlace, Release 8.0, last viewed Jan. 25, 2012, retrieved from <http://docwiki.cisco.com/wiki/Cisco_Unified_MeetingPlace_Release_8.0_--_Configuring_Dial-Out_Features_for_Cisco_Unified_MeetingPlace>.

* cited by examiner

INTERACTIVE RESPONSE SYSTEM FOR HOSTED SERVICES

TECHNICAL FIELD

The present description relates generally to providing interactive response systems for hosted services, and more particularly, but not exclusively, to providing interactive response systems for accessing and controlling hosted services.

BACKGROUND

Multiple individual users participating in a hosted service, such as a hosted multiway multimedia conferencing service, may be able to interact and communicate with one another irrespective of the users' physical locations and irrespective of the technological capabilities of the users' devices. For example, some users may access the hosted service using devices that include a display for viewing/accessing a graphical user interface (GUI) corresponding to the hosted service, such as a computer, while other users may access the hosted service using devices that do not include such a display, such as legacy telephones.

In some instances, the hosted service may allow participating users to invite additional users to participate in the hosted service. For example, users participating in a multiway multimedia conference may invite an additional user to join the multiway multimedia conference. However, since the participating users and the invited user may be disparately located, and since the participating users and the invited user may access the hosted service using technologically disparate devices, the invited user may be unable to control and interact with the hosted service in the same manner in which the participating users control and interact with the hosted service.

SUMMARY

The disclosed subject matter relates to a machine-implemented method for providing an interactive response system for hosted services. The method may include receiving, using one or more computing devices, a plurality of data streams from a plurality of participant devices. The method may further include transmitting, in response to receiving each of the plurality of data streams from each of the plurality of participant devices and using the one or more computing devices, each of the plurality of data streams to the other of the plurality of participant devices. The method may further include receiving, from one of the plurality of participant devices and using the one or more computing devices, a request to initiate communication with an invitee device. The method may further include processing, using the one or more computing devices, the plurality of data streams to determine a language associated with the plurality of data streams and providing, to the invitee device and using the one or more computing devices, a communication in the determined language.

In another aspect, the machine implemented method may include providing, using one or more computing devices, a hosted service to a plurality of participant devices. The method may further include receiving, using the one or more computing device, a request from one of the plurality of participant devices to invite an additional device to participate in the hosted service. The method may further include determining, using the one or more computing devices, a language associated with communications of the plurality of participant devices accessing the hosted service, and providing, in the determined language and using the one or more computing devices, an invitation to participate in the hosted service to the additional device.

The disclosed subject matter also relates to a system for providing an interactive response system for hosted services. The system may include a processor and a memory including instructions that, when executed by the processor, cause the processor to facilitate the steps of: receiving a plurality of data streams from a plurality of participant devices, transmitting, in response to receiving each of the plurality of data streams from each of the plurality of participant devices, each of the plurality of data streams to the other of the plurality of participant devices, receiving, from one of the plurality of participant devices, a request to initiate communication with an invitee device, processing the plurality of data streams to determine a language associated with the plurality of data streams, and providing, to the invitee device, a communication in the determined language.

The disclosed subject matter also relates to a machine-readable medium comprising instructions stored therein, which when executed by a machine, cause the machine to perform a method that includes providing a hosted service to a plurality of participant devices and receiving a request from one of the plurality of participant devices to invite an additional device to participate in the hosted service. The method may further include determining a language associated with communications of the plurality of participant devices accessing the hosted service. The method may further include providing, in the determined language, an invitation to participate in the hosted service to the additional device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
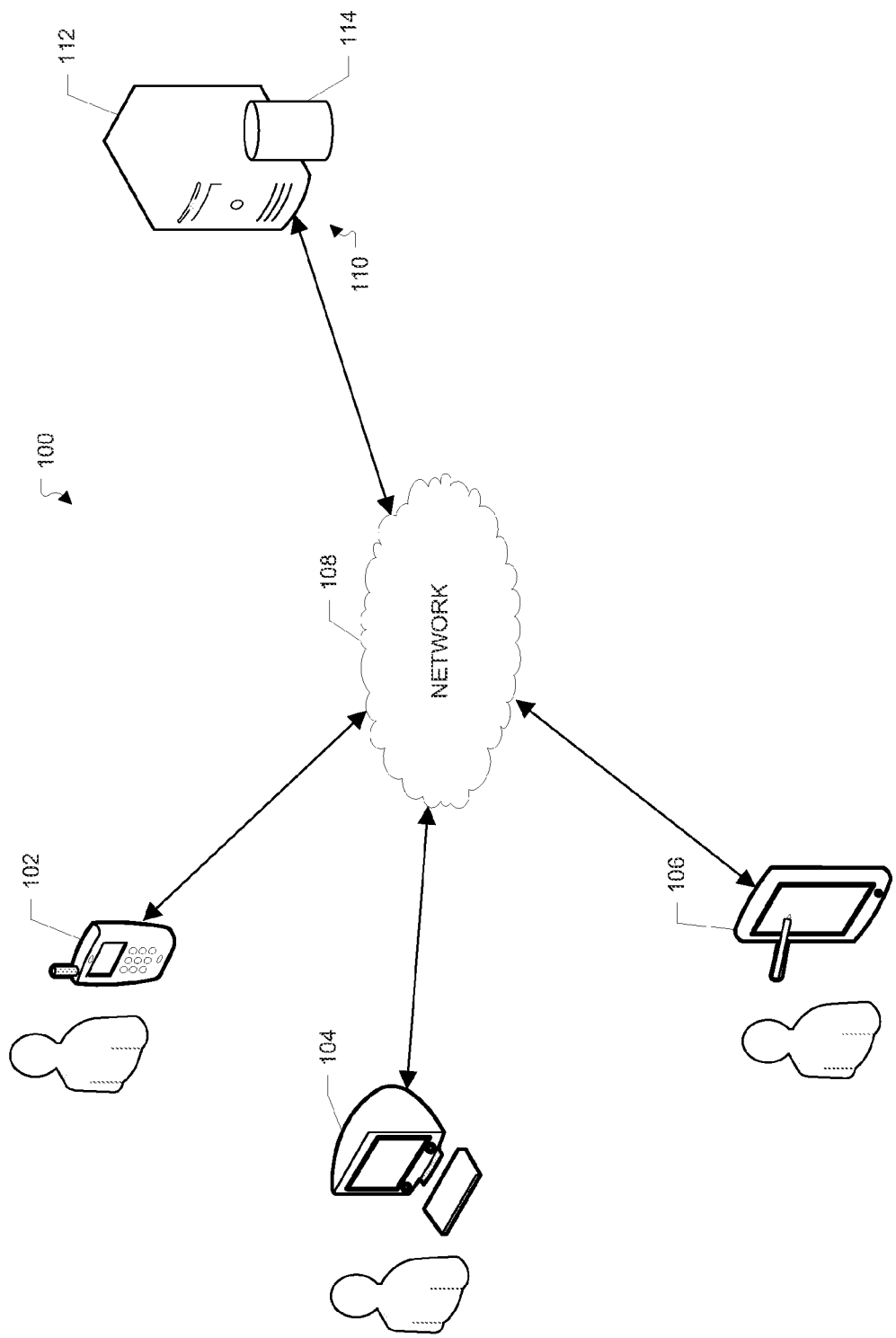
FIG. 1 illustrates an example client-server network session that may provide for an interactive response system for hosted services.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

Hosted multimedia conferencing technology enables individual users located in disparate geographic locations, and operating disparate devices, e.g. devices having different operating systems, different screen resolutions, different processing capabilities, etc., to participate in a multimedia conference without the need for each user to possess expensive video conferencing equipment. In one example, a user may participate in a hosted multimedia conference using any web browser-enabled device, such as a device that can provide a graphical user interface to the user for controlling features of the multimedia conference. In this manner, hosted multimedia conferencing may allow users to view and hear one another, such as in order to participate in panel discussions, multi-person interviews, or classes, irrespective of the users' geographic locations and with minimal user device requirements.

A hosting device may host a multimedia conference between multiple participants. The hosting device may be a server, one or more devices of the participants, or any combination thereof. The participants in the multimedia conference may request that the hosting device invite additional users to participate in the multimedia conference. For example, a participant may provide a user identifier, or a telephone number, of a user they wish to invite to participate in the multimedia conference. If a participant provides a telephone number for a user they would like to invite to the multimedia conference, the hosting device may send an invitation to the invited user by way of the provided telephone number. For example, the hosting device may provide an initial communication of an interactive response system, such as an interactive voice response (IVR) system, an interactive messaging response (IMR) system, an interactive video response system, or any combination thereof, to the invited user using the provided telephone number and/or user identifier.

In the instance of an IVR, the hosting device may dial the provided telephone number and may provide the invited user with an IVR that allows the invited user to connect to the multimedia conference, such as by interacting with the IVR through speech commands. In the instance of an interactive messaging response system, the hosting device may send a message to the telephone number provided for the invited user, such as a text message, that allows the user to connect to the multimedia conference, such as by clicking on a link included in the message or by responding to the message.

An IVR system may refer to a technology that allows a computer to interact with a user through the use of voice and Dual-tone multi-frequency signaling (DTMF) keypad inputs. For example, an invited user may interact with an IVR provided by the hosting device via a telephone keypad or by speech recognition. An IMR system may refer to a technology that allows a computer to interact with a user through messaging, such as text messaging or instant messaging. For example, an invited user may interact with an IMR provided by the hosting device by responding to text messages sent by the hosting device. However, in order for the invited user to be able to interact with a provided interactive response system, the initial communication from the interactive response system should be in a language that the invited user can understand.

Since participants in multimedia conferences may be disparately located across the world, the preferred language of one of the participants in the multimedia conference, such as the hosting participant or the participant who invites an invited user, may not be an appropriate language for an initial communication with the invited user. As such, the hosting device may need to determine an appropriate language to use for the initial communication with an invited user. In some instances, the hosting device may be able to retrieve user preferences, such as a preferred language, based on the telephone number provided for the invited user. However, if the telephone number is not associated with a user account, and if the telephone number is not otherwise associated with a preferred language, the hosting device may be unable to determine a preferred language based on the telephone number.

The hosting device may also determine a preferred language based on a geographic region associated with the telephone number of the invited user. However, in some instances there may be multiple languages associated with a given geographic region, e.g. Switzerland. In addition, a user who frequently visits a particular geographic region may have a telephone number associated with the geographic region, but the user may not speak the language associated with the geographic region. Thus, the hosting device may also be unable to determine an appropriate language based on the geographic region associated with the telephone number.

Accordingly, in order to determine an appropriate language for an initial communication with an invited user, the hosting device may process the communications between the participants of the multimedia conference to determine the language being used by the participants to communicate with one another. For example, the hosting device may determine the language being used by the participants by performing natural language processing, and/or language recognition processing on the communications between the participants of the multimedia conference. The hosting device may then send an initial communication to the invited user in the language being used by the participants in the multimedia conference. Alternatively, or in addition, the initial communication to the invited user may also include information in a second language determined through one of the other aforementioned mechanisms.

Alternatively, or in addition, the hosting device may dynamically infer an appropriate language for an initial communication with an invited user at the time that the initial communication is provided to the invited user. For example, the hosting device may initiate a phone call to an invited user. The invited user may answer their phone in response to the phone call, such as by speaking a greeting in their preferred language, e.g. "Hello," in English, or "Hola," in Spanish, etc. The hosting device may process the greeting spoken by the invited user to determine a language associated with the greeting, such as by performing natural language processing, and/or language recognition processing on the greeting. The hosting device may then provide the initial communication to the invited user in the determined language, such as by providing a welcome message to the user.

Alternatively, or in addition, if the determined language for the initial communication is not appropriate for the invited user, the invited user may not understand the initial communication, such as a welcome message. In this instance, the invited user may respond to the welcome message by saying "I do not understand," in their preferred language. The hosting device may process this second response from the user to further refine the language determination. For example, a person living in Sweden who does not speak Swedish may respond to a phone call by saying "I don't understand Swedish," or the same phrase in Swedish "Ja förstå inte svenska," or "do you speak English?," or the same phrase in Swedish, "Pratar du engelska?" The hosting device may process any of these responses to determine a language of the response and/ or to determine the content of the response, such as through performing natural language processing, language recognition processing, and/or speech recognition. The hosting device may then use the language of the response and/or the content of the response to determine an appropriate language for communicating with the invited user. Alternatively, or in addition, an invited user who does not speak English or Swedish may respond by speaking in another language, such as Spanish. For example, the invited user may say "Lo siento," or "hablas español?," both of which may be processed to determine an appropriate language for communicating with the invited user, such as through natural language processing, and/or language recognition processing.

In response to the initial communication, the invited user may interact with the interactive response system of the hosting device. The interactive response system may provide the user with an option to change the language of the interactive response system, or to continue interacting with the interactive response system in the language being communicated by the participants of the multimedia conference. The interactive response system may also request that the user provide a passphrase for authentication purposes, or the interactive response system may request that the user answer one or more questions for questions for authentication purposes. The user may interact with the interactive response system, e.g. by speaking or pressing keys on the telephone keypad for an IVR system, or by submitting text messages for an IMR system, to provide the requested authentication information. Once the user has been authenticated by the interactive response system, the hosting device may connect the user to the multimedia conference.

The hosting device may also use an interactive response system for interacting with a user when the user initiates communication with the hosting device through a telephone call. For example, a user may dial a telephone number, or send a text message, to connect to a multimedia conference. The user may be identified based on caller identification, e.g. based on the telephone number of the device from which the user initiated communication with the hosting device. The hosting device may then interact with the user through an interactive response system in the aforementioned manner.

Alternatively, or in addition, a user may dial a telephone number, or send a text message, to access another hosted service provided by the hosting device, such as a social networking service, an email service, a gaming service, or generally any service provided by, or accessible through, the hosting device. In the example of a social networking service, upon authenticating the user, the hosting device may provide the user with an interactive response system that allows the user to access various functionality of the social networking service, e.g. joining a group discussion, starting a new group discussion, initiating a multimedia conference, or generally any functionality of the social networking service.

In some instances, participants in a multimedia conference, or users of any other hosted service, may not have access to a web browser enabled device, or may not be able to interact with a web browser, and therefore may be unable to access a graphical user interface for controlling features of the multimedia conference or of any other hosted service. For example, an invited user may only have access to the telephone upon which they originally connected to the multimedia conference, or a participant in a multimedia conference may be driving a vehicle and therefore may be unable to interact with a web browser during the multimedia conference.

In these instances, the hosting device may allow the users to interact with an interactive response system to issue commands to control the multimedia conference, or any other hosted service. For example, an invited user may speak a reserved keyword, such as "command," followed by a command such as "mute," "unmute," "help," "volume up/down," etc. The interactive response system of the hosting device may be configured to recognize commands spoken in the language in which the initial communication was sent to the user, or in a language subsequently selected by the user. When the interactive response system of the hosting device recognizes a command, the hosting device may perform an action associated with the issued command, such as muting the audio of the user's device.

Alternatively, or in addition, participants in a multimedia conference, or users of other hosted services, may be able to access a graphical user interface for controlling the multimedia conference, or the other hosted services, such as through a computing device with a display. However, the hosting device may also allow these participants and users to issue commands to control the multimedia conference, or the other hosted services, through an interactive messaging system. In this manner, the hosting device may allow these participants and users to engage in multimodal interactions with regards to the multimedia conference or with regards to the other hosted services.

II. Example Client-Server Network Environment for Providing an Interactive Response System for Hosted Services FIG. 1 illustrates an example client-server network environment which may implement an interactive response system for hosted services, such as a hosted multimedia conference. Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some examples, electronic devices 102, 104, 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used for displaying a web page or a web application. Alternatively, or in addition, electronic devices 102, 104, 106 can be devices that do not include a display capable of displaying a web page or a web application, or devices that include a display capable of displaying a web page or a web application but are otherwise incapable of displaying a web page or a web application. For example, one or more of electronic devices 102, 104, and 106 can be a device that does not include a display, a device that does not include a display capable of displaying a web page or a web application, a device that includes a display capable of displaying a web page or a web application, but is incapable of accessing a web page or a web application, such as a device that does not have access to the Internet, or a device that includes a display capable of displaying a web page or a web application but does not include processing resources for displaying a web page or a web application. In general, electronic devices 102, 104, 106 may be any devices capable of any form of communication with at least one of the other electronic devices 102, 104, 106, and/or with the server 110, irrespective of whether the electronic devices 102, 104, 106 are capable of displaying a web page or a web application. In the example of FIG. 1, electronic device 102 is depicted as a smartphone, electronic device 104 is depicted as a desktop computer and electronic device 106 is depicted as a tablet device.

In one example, server 110 includes processing device 112 and data store 114. Processing device 112 executes computer instructions stored in data store 114, for example, to provide an interactive response system for a hosted service to one or more of the electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, the electronic devices 102, 104, 106 may be in communication with one another without communicating with server 110.

Users interacting with electronic devices 102, 104, 106 may participate in a hosted service, such a multimedia conferencing service, a social networking service, a gaming service, or generally any service that may be hosted by a hosting device, such as the server 110. The phrases "multiway multimedia conference" or "multimedia conference" as used herein encompass their plain and ordinary meaning and may also refer to a multimedia conference between two or more electronic devices 102, 104, 106, where each electronic device transmits one or more data streams, such as a video stream, an audio stream, or a text stream, and each electronic device receives one or more data streams, such as a video stream, an audio stream, or a text stream, from at least one other of the electronic devices. Accordingly, the electronic devices 102, 104, 106, may include, or may be coupled to, a camera, or other devices for capturing video, audio, and/or text, and may include an output devices for viewing video and/or hearing audio.

In one example, if users interacting with electronic devices 102, 104, 106 are participating in a multimedia conference hosted by a hosting device, such as server 110, the electronic devices 102, 104, 106, may transmit data streams, such as video streams, audio streams, and/or text streams, to the server 110. The phrase "hosting device" as used herein encompasses its plain and ordinary meaning and may also refer to a device that is hosting a service provided to the electronic devices 102, 104, 106, such as a multimedia conferencing service, a social networking service, a gaming service, or generally any service that can be hosted. The hosting device, such as the server 110, may transmit the data streams received from each electronic devices 102, 104, 106 to the other electronic devices 102, 104, 106. The electronic device of a user participating in a hosted service may be referred to herein as a participant device.

The data streams received from each of the electronic devices 102, 104, 106 may include communications between the users that are interacting with the electronic devices 102, 104, 106, such as the video streams, audio streams, and/or text streams. In one example, the communications between the users may be in a common language that is used by the users to communicate with one another. For example, a language associated with the communications may be English, Spanish, Chinese, Braille, sign language, or generally any language that may be used to communicate between users.

The phrase "language" as used herein encompasses its plain and ordinary meaning and may also refer to any form or manner of expression that may be used to communicate information between users of a hosted service, such as audible expressions, written expressions, visible expressions, virtual expressions, verbal expressions, unspoken expressions, physical expressions, or generally any expressions capable of communicating information from one user to another in a hosted service.

Alternatively, or in addition, the users interacting with the electronic devices 102, 104, 106 may be communicating with each other in the hosted service using one or more disparate languages. In this example, the electronic devices 102, 104, 106, or the server 110, may translate the data streams transmitted to each user into the language in which the user is communicating in.

A hosted service may allow one or more of the users participating in the hosted service to invite additional users to participate in the hosted service. For example, a participating user may provide the hosting device, such as the server 110, with information for initiating communication with an additional user, such as a telephone number associated with the additional user, a user identifier associated with the additional user, or generally any information that may be used to initiate communication with the additional user. A device of an additional user may be any of the aforementioned electronic devices 102, 104, 106 and may also be referred to herein as an additional device, or an invitee device. The hosting device may provide an interactive mechanism, such as an interactive response system, in order to assist the additional user with joining a hosted service, such as a hosted multimedia conference.

The hosting device, such as the server 110, may receive a request to invite an additional user from one of the electronic devices 102, 104, 106. In order to provide the additional user with an efficient mechanism for joining the hosted service, the hosting device may attempt to initiate communication with the additional user in a language most likely to be understood by the additional user and/or in a communication form most likely to be accessible by the additional user. Since one or more of the participants accessing the hosted service and the additional user may be disparately located, and may be using technologically disparate devices, the communication form and language preferred by one of the participants accessing the hosted service may not be accessible and/or comprehendible by the additional user.

The phrases "communication form" or "form of communication" as used herein encompass their plain and ordinary meaning and may also refer to any form of providing a communication to a user, such as providing a communication through a phone call, providing a communication through an instant message, providing a communication through a network connection, or generally any means of providing a communication to a user.

In order to determine an appropriate language for providing an initial communication to the additional user, the hosting device may process the data streams being transmitted by the electronic devices 102, 104, 106 to determine a language associated with the communications of the data streams, such as a language being used by the participants to communicate with one another. The hosting device may perform natural language processing, language recognition processing, or generally any processing capable of identifying a language, to determine the language being used by the participants of the hosted service.

Alternatively, or in addition, if the participants are using multiple languages to communicate with one another, the hosting device may determine the language being used by the largest number of participants, or the language being used most frequently, irrespective of the number of participants using the language. Alternatively, or in addition, the hosting device may determine an appropriate language for the initial communication using a combination of one or more of the mechanisms described herein.

In order to determine an appropriate form for providing the initial communication to the additional user, the hosting device may process the information provided by the requesting user and/or any other information regarding the additional user that is accessible to the hosting device. For example, if the information provided by the requesting user includes a phone number, the hosting device may determine that a phone call or a text message is the appropriate form for providing the initial communication to the additional user. In another example, if the information provided by the requesting user is an identifier of the additional user, the hosting service may determine that an instant message is the appropriate form for providing the initial communication. Alternatively, or in addition, if the requesting user provides a telephone number of the additional user, or if a telephone number of the additional user is otherwise available, the hosting device may first attempt to initiate communication with the additional user through a phone call.

After determining the appropriate form and language for initiating communication with the additional user, the hosting device may provide an initial communication to the invited user in the determined form and in the determined language. Alternatively, or in addition, the initial communication to the invited user may also include information in a second language determined through one or more of the other mechanisms described herein, such as a language corresponding to the geographic region associated with a telephone number of the additional user. Alternatively, or in addition, the hosting device may send a second initial communication in a second form, such as by initiating a phone call with the additional user while also providing a text message to the additional user.

If the determined communication form is a telephone call, the initial communication provided to the additional user may be, for example, an initial communication of an interactive voice response system for accessing the hosted service. Alternatively, or in addition, if the determined communication form is a text message, the initial communication to the invited user may be an initial communication of an interactive messaging response system for accessing the hosted service. The process of providing an initial communication to the invited user in the determined language and/or in the determined form is further discussed in FIGS. 2 and 3 below.

In response to the initial communication, the additional user may interact with the interactive response system provided by the hosting device to join and/or access the hosted service. For example, the invited user may interact with the interactive response system, e.g. by speaking, or pressing keys on the telephone keypad, for an IVR system, or by submitting text messages for an IMR system. The invited user may authenticate with the hosting device using the interactive response system and may then be connected to the hosted service, such as a hosted multimedia conference.

The hosting device may also provide an interactive response system to allow the electronic devices 102, 104, 106 to control aspects of the hosted service. For example, the electronic devices 102, 104, 106 may control aspects of the hosted service independent of, or in addition to, a graphical user interface corresponding to the hosted service. The phrase "aspect of the hosted service" as used herein encompasses its plain and ordinary meaning and may also refer to any controllable or modifiable aspect or functionality of a hosted service.

For example, in the case of a social networking service, aspects of the service that may be controlled through an interactive response system provided by the hosting device may include accessing various functionality of the social networking service, e.g. joining a group discussion, starting a new group discussion, initiating a multimedia conference, or generally any functionality of the social networking service. In the example of a multimedia conferencing service, aspects of the service that may be controlled through an interactive response system may include volume levels associated with the multimedia conference, or functionality associated with the multimedia conference, such as requesting assistance with the multimedia conference, inviting additional users to the multimedia conference, exiting the multimedia conference, or any functions that can be performed by accessing a graphical user interface associated with the multimedia conference.

In one example, participants of a hosted service may initiate access to an interactive response system of a hosted service by communicating an indicator to the hosting device, such as a keyword, a DTMF tone, or generally any indicator capable of being communicated to the hosting device. Since the hosting device may provide multiple interactive response systems to the participants of the hosted service, the participants may communicate an indicator to the hosting device in a form that corresponds to the interactive response system that they would like to access. For example, if a participant wishes to access an interactive voice response system, the user may speak a keyword, such as "command." The hosting device may determine that the participant has spoken the keyword and, in response thereto, may provide the participant with an interactive voice response system.

In the example of a hosted multimedia conference, a participant may speak the keyword while their audio stream is muted or un-muted. In the case of an un-muted audio stream, the hosting device may mute the audio stream of the participant in response to the participant speaking the keyword. Alternatively, or in addition, in response to the participant speaking the keyword, the hosting device may process the audio stream of the participant such that the keyword is not communicated to the other participants of the hosted multimedia conference.

For example, the hosting device may implement a short delay before providing the audio streams of the participants to one another. The length of the delay may be determined based upon the amount of time necessary to speak a portion of the keyword, such as the first syllable of the keyword, the first letter of the keyword, or the entire keyword. In the example of the first syllable of the keyword, when the hosting device determines that a participant has spoken the first syllable of the keyword, the hosting device may pause the audio stream of the participant for a period of time necessary for the participant to speak the remainder of the keyword. If the hosting device determines that the participant subsequently spoke the remainder of the keyword, the hosting device may mute the audio stream of the participant and may prevent the first syllable of the keyword, or any portion of the keyword, from being communicated to the other participants. However, if the hosting device determines that the participant subsequently did not speak the remainder of the keyword, or a portion of the remainder of the keyword, such as the second syllable or the second letter of the keyword, the hosting device may continue to provide the communications of the participant to the other participants in the hosted service.

Alternatively, or in addition, if a participant in a multimedia conference wishes to access an interactive video response system, the participant may communicate an indicator to the hosting device through a physical action determinable from the video stream of the user, such as by holding their hand in a particular location. The hosting device may identify the action by processing the video stream of the participant, and may provide the participant with an interactive video response system, or another interactive response system. The process of providing a participant with an interactive response system for controlling a hosted service is discussed further in FIG. 4 below.

Figure 2:
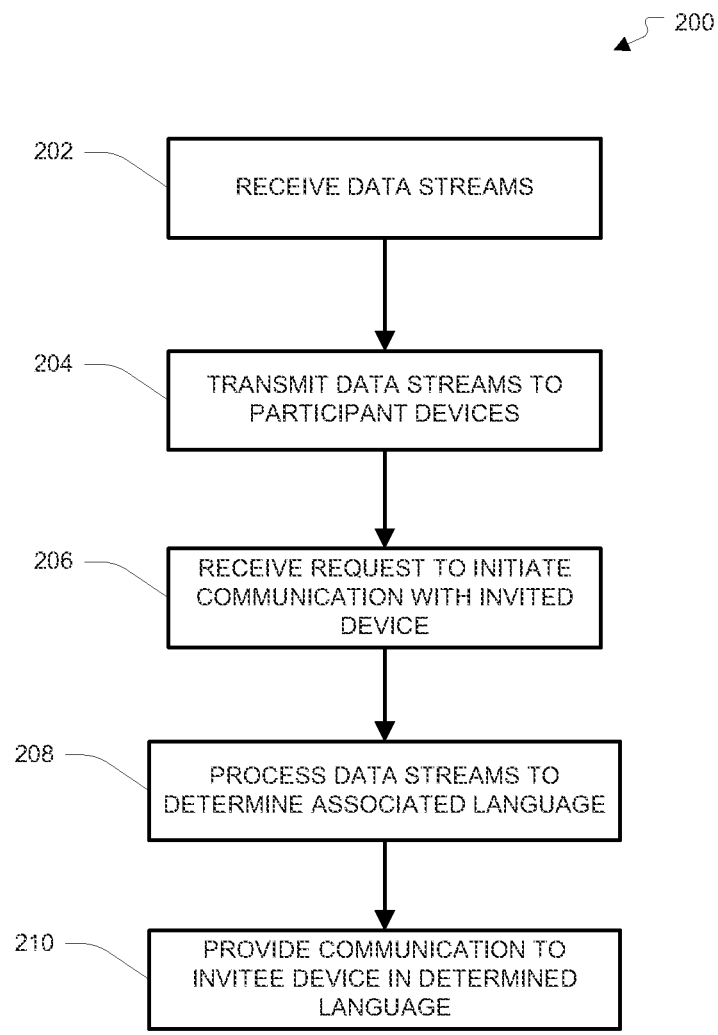
FIG. 2 illustrates a flow diagram of an example process for providing an interactive response system for a hosted multimedia conferencing service.

III. Example Processes for Providing an Interactive Response System for Hosted Services FIG. 2 illustrates a flow diagram of an example process 200 for providing an interactive response system for a multiway multimedia conference. In block 202, a hosting device, such as one or more of the electronic devices 102, 104, 106, or the server 110, may receive one or more data streams, such as video streams, audio streams, and/or text streams, from the device of each participant in a multiway multimedia conference, which may be referred to as participant devices.

In block 204, in response to receiving each of the one or more data streams from the participant devices, the hosting device may transmit the one or more data streams received from each of the participant devices to each of the other participant devices. Alternatively, or in addition, the hosting device may filter or process the received data streams based on the capabilities of each of the other participant devices prior to transmitting the data streams to each of the other participant devices. For example, if one of the participant devices is a telephone that does not include a display, the hosting device may only transmit audio streams to the participant device. Similarly, the hosting device may process any received text streams and may use text-to-speech technology to convert the text streams into audio streams that may be provided to a telephone, such as a telephone incapable of receiving the text streams.

In block 206, the hosting device may receive a request to initiate communication with a device of an additional user, which may be referred to herein as an invitee device or additional device. For example, a participant in the multimedia conference may interact with an interactive response system provided by the hosting device to request that the hosting device initiate communication with the invitee device. Alternatively, or in addition, the invitee device itself may transmit the request to initiate communication, or the request to initiate communication with the invitee device may be transmitted by an entity that is not participating in the multimedia conference. The request to initiate communication with the invitee device may include identifying information associated with the invitee device, or the user interacting with the invitee device, such as a phone number, a user identifier, or generally any identifying information.

In block 208, the hosting device may process the data streams received from the devices of the participants to determine a language associated with the data streams to be used in an initial communication to the invitee device. For example, the hosting device may perform natural language processing on the communications of the data streams to determine a language being communicated by the participants in the multimedia conference. Alternatively, or in addition, if the participants are communicating in multiple languages, the hosting device may determine the language being communicated by the largest number of participants, or the language being communicated in most frequently, irrespective of the number of participants communicating in the language.

Alternatively, or in addition, the hosting device may determine a communication form for providing the initial communication to the invitee device. For example, if the identifying information provided with the request to initiate communication with the invited user includes a phone number, the hosting device may determine that the communication form for providing the initial communication should be a phone call. In the case of a hosted multimedia conference, if the capabilities of the invitee device are unknown, or are not fully determinable, the hosting device may first attempt to contact the invitee device through a phone call, when a phone number of the invitee device is available.

In block 210, the hosting device may provide an initial communication to the invitee device in the determined language, such as the language being communicated in by all of the participants, the language being communicated in by the largest number of participants, or in the language being communicated in most frequently by the participants. For example, the initial communication may be an initial communication of an interactive response system provided by the hosting device. Alternatively, or in addition, when the hosting device determines a form for the initial communication, the hosting device may provide the initial communication to the invitee device in the determined form. For example, the hosting device may provide an initial communication of an interactive voice response system to the invitee device through a telephone call.

The invitee device may interact with the interactive response system to authenticate with the hosting device and to join and/or access the multimedia conference. Alternatively, or in addition, the invitee device may continue to interact with the interactive response system to control various aspects/or and functionality of the multimedia conference, such as to mute or unmute the audio associated with the invitee device. The process of authenticating and controlling a hosted service, such as a hosted multimedia conference, using an interactive response system provided by the hosted device is discussed further in FIG. 4 below.

Figure 3:
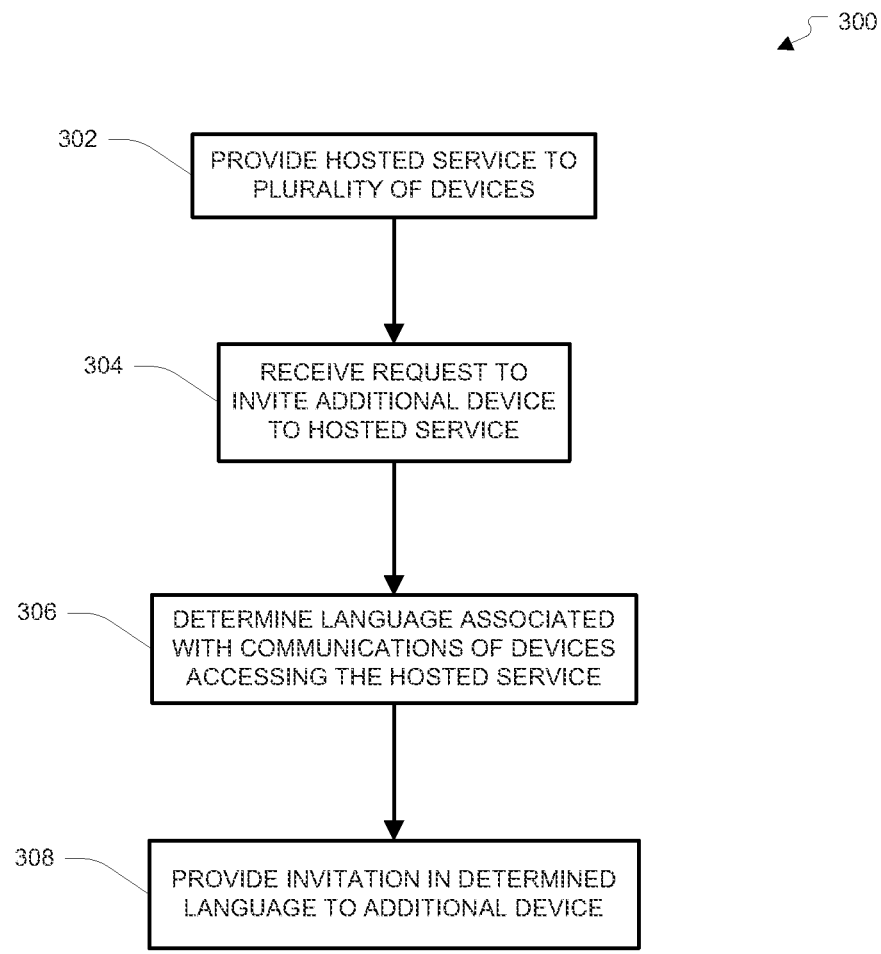
FIG. 3 illustrates a flow diagram of an example process for providing an interactive response system for a hosted service.

FIG. 3 illustrates a flow diagram of an example process 300 for providing an interactive response system for a hosted service. In block 302, a hosting device, such as one or more of the server 110 and the electronic devices 102, 104, 106, may provide a hosted service to one or more of the electronic devices 102, 104, 106, such as a hosted social networking service, a hosted gaming service, a hosted multimedia conference, or generally any hosted service.

In block 304, the hosting device may receive a request to invite an additional device, or an additional user, to participate in the hosted service. For example, one of the users participating in the hosted service may request that an additional user be invited to participate in the hosted service. Alternatively, or in addition, a third party entity that is not participating in the hosted service may request that the additional user be invited to participate in the hosted service.

The request to invite the additional device to participate in the hosted service may include an identifier of the additional device, or an identifier of the additional user, or any other information that can be used to initiate communication with the additional user. For example, the requesting user or entity may provide the hosting device with a phone number associated with the additional device of the additional user, a user identifier associated with the additional user, or generally any information that may be used to initiate communication with the additional user and/or the additional device.

In block 306, the hosting device may determine a language associated with the communications of the devices participating in the hosted service. For example, the hosting device may analyze the communications of the devices, such as by using natural language processing, to determine the language being communicated by the users accessing the hosted service. If the users are not communicating in a single common language, the hosting device may determine the language being communicated by the largest number of users, or the language being communicated most frequently, irrespective of the number of users communicating in the language.

Alternatively, or in addition, the hosting device may determine a communication form for providing the initial communication to the additional device. For example, if the identifying information provided with the request to initiate communication with the additional user includes a phone number, the hosting device may determine that the communication form for providing the initial communication should be a phone call. In the case of a hosted multimedia conference, if the capabilities of the invitee device are unknown, or are not fully determinable, the hosting device may first attempt to contact the invitee device through a phone call, when a phone number of the invitee device is available.

In block 308, the hosting device may provide an invitation in the determined language to the additional device of the additional user. For example, the invitation may be a communication that redirects the additional device to a web page or a web application for authenticating with the hosting device and joining the hosted service. Alternatively, or in addition, when the hosting device determines a form for the initial communication, the hosting device may provide the initial communication to the invitee device in the determined form. For example, the hosting device may provide an initial communication of an interactive voice response system to the invitee device through a telephone call. Once the additional user is connected to the hosted service, the additional user may continue to interact with the hosted service through the interactive response system, or the hosting device may provide the additional user with a graphical user interface to interact with the hosted service, when the additional device is capable of displaying such a graphical user interface.

Alternatively, or in addition, the additional user may continue to interact with the hosted service through the interactive response system, such as to control or modify aspects or functionality of the hosted service. For example, the interactive response system provided by the hosted device may allow the additional user to perform any of the functionality that can be performed through the graphical user interface associated with the hosted service. The process of controlling aspects and/or functionality of a hosted service using an interactive response system is discussed further in FIG. 4 below.

Figure 4:
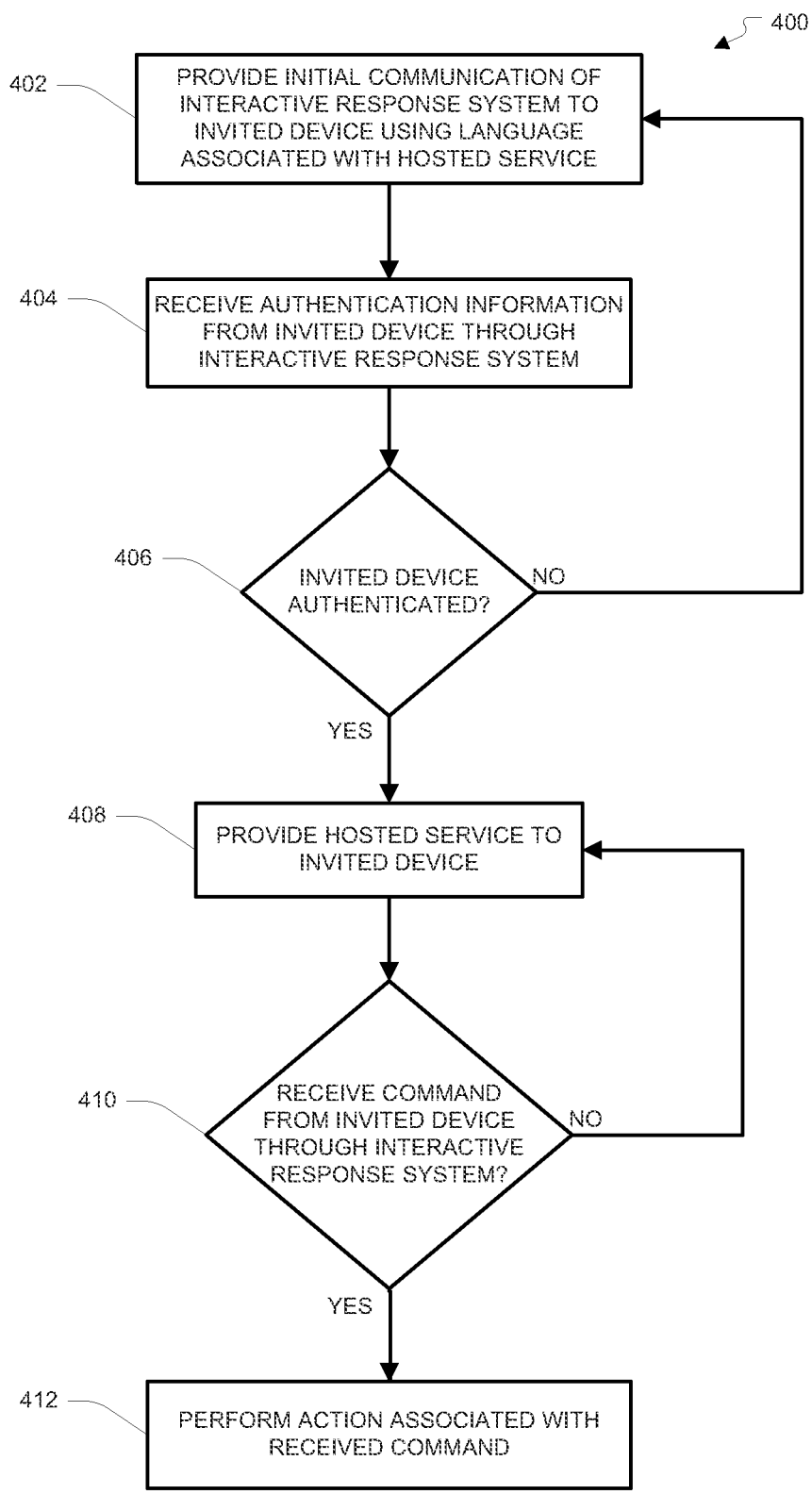
FIG. 4 illustrates a flow diagram of an example process for providing an interactive response system for controlling a hosted service.

FIG. 4 illustrates a flow diagram of an example process 400 for providing an interactive response system for controlling a hosted service. In block 402, a device providing a hosted service may provide an initial communication of an interactive response system to an invited device in a language associated with the hosted service. For example, the hosting device may determine the language being communicated by participants of the hosted service.

In block 404, the hosting device may receive authentication information from the invited device through the interactive response system. For example, the user of the invited device may interact with an interactive response system to provide a password and/or to answer one or more security questions in order to authenticate with the hosted service. Alternatively, or in addition, the hosting device may process a spoken communication from the user to authenticate the voice of the user.

In block 406, the hosting device may determine whether the invited device was properly authenticated through the interactive response system. For example, the hosting device may determine whether the authentication information provided by the invited device coincides with information stored at the hosting device. If, in block 406, the hosting device determines that the invited device was not properly authenticated, the hosting device may return to block 402 and provide the initial communication to the invited device again. Alternatively, or in addition, prior to providing the initial communication to the invited device for a second time, the hosting device may confirm that the language used in the initial communication is preferable for the user, such as through the interactive response system. If the invited user indicates that the determined language is not preferable, the hosting device may allow the user to change the language used by the interactive response system.

If, in block 406, the hosting device determines that the invited device was properly authenticated, the hosting device moves to block 408. In block 408, the hosting device provides the hosted service to the invited device. For example, the hosting device may provide a social networking service, a gaming service, a multimedia conferencing service, or generally any hosted service to the invited device.

In block 410, the hosting device determines whether a command has been received from the invited device through the interactive response system. The user may provide a command to the interactive response system by providing a command keyword, such as the word "command," "control," or generally any keyword, followed by a command to be performed. For example, in the context of an interactive voice response system, the invited user may speak the word "command" followed by a command to be performed, such as "mute."

Alternatively, or in addition, the user may activate a menu system associated with the interactive response system by providing the command keyword. For example, in the context of an interactive voice response system, the user may speak the word "command" to activate a menu system of the interactive voice response system. In response to receiving the command, the hosting device may provide the user with menu selections of the interactive voice response system. In order to minimize interference with audio associated with the hosted service, the hosting device may mute or reduce the volume of the hosted service while the user is being provided with the menu selections of the interactive voice response system.

Alternatively, or in addition, the user may activate an interactive assistance system by providing the command keyword. In this example, in response to receiving the command keyword, the hosting device may provide a communication to the user asking the user how the hosting device can assist the user. The user may provide a communication to the interactive assistance system indicating the command or assistance the user would like performed, such as by speaking a question or a command to the interactive assistance system.

Alternatively, or in addition, in the example of a hosted multimedia conference, the user may activate a menu system associated with an interactive video response system by performing a physical action command within their video stream, such as by holding their hand in a particular location. In this example, in response to receiving the physical action command, the hosting device may overlay a visible menu system over the video stream of the user. The user may then use physical action commands, such as by moving their hands, to access the menu options of the displayed menu system. In one example, the hosting device may stop transmitting the video stream of the user to the other participants while the user is accessing the menu system of the interactive video response system.

If, in block 410, the hosting device determines that a command has not been received from the invited device, the hosting device returns to block 408 and continues to provide the hosted service to the invited device. If, in block 410, the hosting device determines that a command has been received from the invited device, the hosting device moves to block 412. In block 412, the hosting device analyzes the command received from the invited user and performs the action associated with the received command. For example, in the context of an interactive voice response system where the command keyword is "command," if the hosting device determines that the invited user spoke the words "command mute," the hosting device may mute the audio associated with the device of the invited user. For example, the hosting device may mute the audio being transmitted by the invited device in the hosted service and/or the audio being received by the invited device in the hosted service.

Alternatively, or in addition, if the hosting device is unable to determine the command requested by the invited device, or if the command is otherwise ambiguous or unclear, the hosting device may provide a response to the user requesting that the user repeat, or clarify, the command. For example, if the user provides a command of "mute," the hosting device may respond through the interactive response system with a communication requesting whether the user would like to mute their transmitted audio, their received audio, or both. The user may repeat the command, or provide a clarification in regards to the command, through the interactive response system.

IV. Example Interactive Response System for Hosted Services

Figure 5:
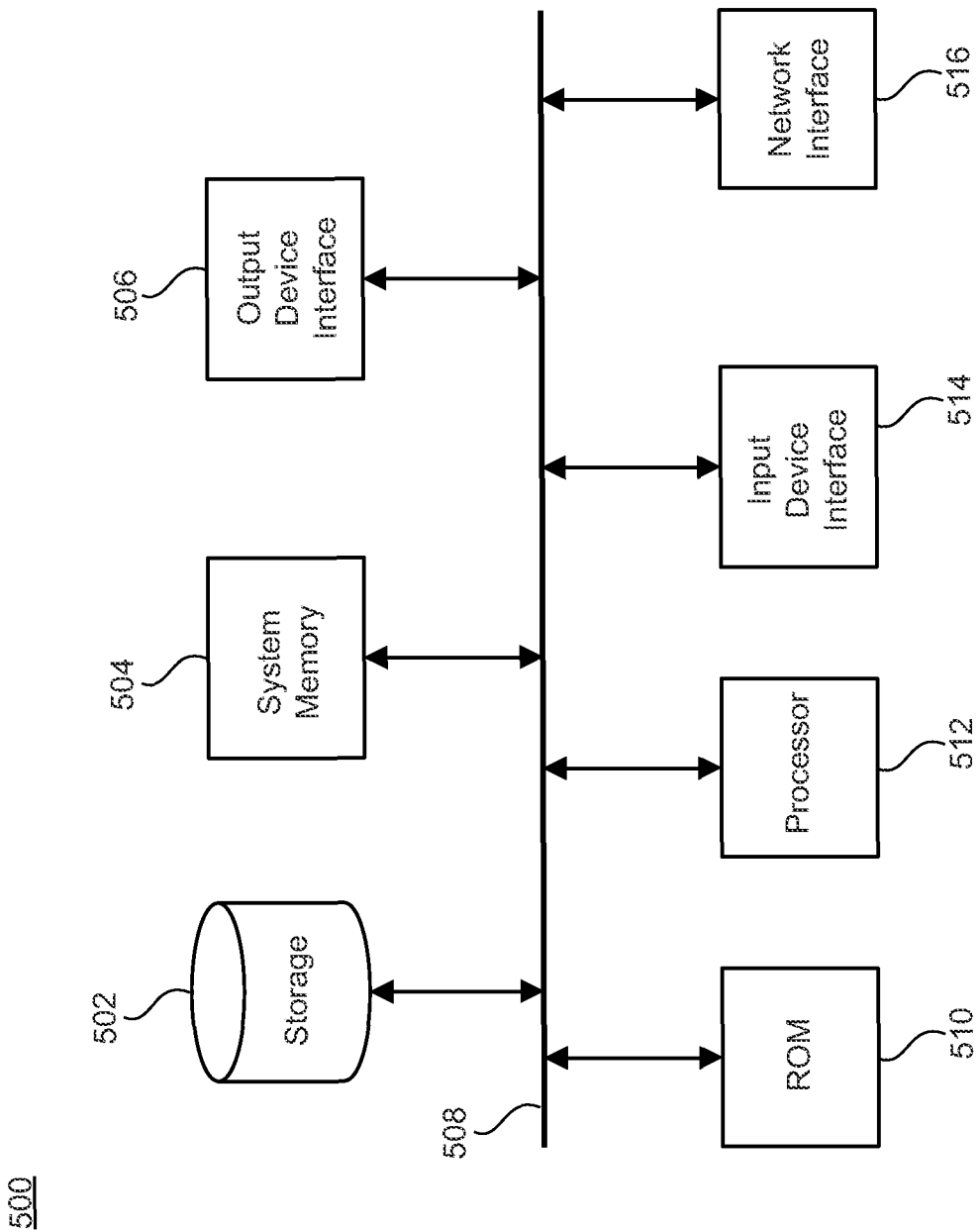
FIG. 5 conceptually illustrates an electronic system with which some implementations of the subject technology may be implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units may include instructions for processing interactive responses in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for providing an interactive response system, the method comprising:
   receiving, using one or more computing devices, a plurality of data streams from a plurality of participant devices associated with a hosted service;
   transmitting, in response to receiving each of the plurality of data streams from each of the plurality of participant devices and using the one or more computing devices, each of the plurality of data streams to the other of the plurality of participant devices;
   receiving, from one of the plurality of participant devices and using the one or more computing devices, a request to initiate communication with an invitee device, the request comprising an identifier for identifying a user of the invitee device;
   processing, using the one or more computing devices, the plurality of data streams to determine a language associated with the plurality of data streams;
   selecting, using the one or more computing devices and based on the identifier, a first communication format, from among a plurality of communication formats, for providing a first communication to the invitee device, the first communication format corresponding to a first communication medium used for initiating the first communication with the invitee device;
   providing, to the invitee device, the first communication comprising a first invitation to participate in the hosted service, the first invitation being in the determined language and in the selected first communication format; and
   if the first communication fails to be initiated,
      selecting, using the one or more computing devices and based on the identifier, a second communication format, from among the plurality of communication formats, for providing a second communication to the invitee device, the second communication format corresponding to a second communication medium used for initiating the second communication with the invitee device;
      providing, to the invitee device, the second communication comprising a second invitation to participate in the hosted service, the second invitation being in the determined language and in the selected second communication format.

2. The method of claim 1, wherein the first communication provided to the invitee device further comprises an initial communication of an interactive response system.

3. The method of claim 2, further comprising authenticating, using the one or more computing devices, the invitee device through the interactive response system.

4. The method of claim 3, further comprising:
   transmitting, using the one or more computing devices, each of the plurality of data streams to the invitee device;
   receiving, using the one or more computing devices, a data stream from the invitee device; and
   transmitting, using the one or more computing devices, the data stream from the invitee device to each of the plurality of participant devices.

5. The method of claim 4, further comprising, receiving a command from the invitee device through the interactive response system.

6. The method of claim 5, further comprising, performing an action indicated by the command.

7. The method of claim 6, wherein the action comprises modifying an audio level associated with the invitee device.

8. The method of claim 2, wherein the interactive response system comprises at least one of an interactive voice response system or an interactive messaging response system.

9. A computer-implemented method for providing an interactive response system, the method comprising:
   providing, using one or more computing devices, a hosted service to a plurality of participant devices;
   receiving, using the one or more computing device, a request from one of the plurality of participant devices to invite an additional device to participate in the hosted service, the request comprising an identifier for identifying a user of the additional device;
   determining, using the one or more computing devices, a language associated with communications of the plurality of participant devices accessing the hosted service;
   selecting, using the one or more computing devices and the identifier, a first communication format, from among a plurality of communication formats, for providing a first communication to the additional device, the first communication format corresponding to a first communication medium used for initiating the first communication with the additional device;
   providing, using the one or more computing devices, the first communication comprising a first invitation to participate in the hosted service to the additional device, the first invitation being in the determined language and the selected first communication format; and
   if the first communication fails to be initiated,
      selecting, using the one or more computing devices and based on the identifier, a second communication format, from among the plurality of communication formats, for providing a second communication to the additional device, the second communication format corresponding to a second communication medium used for initiating the second communication with the additional device;
      providing, to the additional device, the second communication comprising a second invitation to participate in the hosted service, the second invitation being in the determined language and in the selected second communication format.

10. The method of claim 9, wherein the invitation provided to the additional device comprises an initial communication of an interactive response system.

11. The method of claim 10, further comprising authenticating, using the one or more computing devices, the additional device through the interactive response system.

12. The method of claim 11, further comprising providing, using the one or more computing devices, the hosted service to the additional device upon authenticating the additional device.

13. The method of claim 12, further comprising, receiving a command to control an aspect of the hosted service from the additional device through the interactive response system.

14. The method of claim 13, further comprising, controlling the aspect of the hosted service in accordance with the command.

15. The method of claim 14, wherein the aspect of the hosted service comprises an audio level associated with the additional device.

16. The method of claim 10, wherein the interactive response system comprises at least one of an interactive voice response system or an interactive messaging response system.

17. A system, comprising:
a processor; and
a memory including instructions that, when executed by the processor, cause the processor to facilitate the steps of:
receiving a plurality of data streams from a plurality of participant devices associated with a hosted service;
transmitting, in response to receiving each of the plurality of data streams from each of the plurality of participant devices, each of the plurality of data streams to the other of the plurality of participant devices;
receiving, from one of the plurality of participant devices, a request to initiate communication with an invitee device, the request comprising identifier for identifying a user of the invitee device;
processing the plurality of data streams to determine a language associated with the plurality of data streams;
selecting, based on the identifier, a first communication format, from among a plurality of communication formats, for providing a first communication to the invitee device, the first communication format corresponding to a first communication medium used for initiating the first communication with the invitee device;
providing, to the invitee device, the first communication comprising a first invitation to participate in the hosted service, the first invitation being in the determined language and in the selected first communication format;
if the first communication fails to be initiated,
selecting, using the one or more computing devices and based on the identifier, a second communication format, from among the plurality of communication formats, for providing a second communication to the invitee device, the second communication format corresponding to a second communication medium used for initiating the second communication with the invitee device;
providing, to the invitee device, the second communication comprising a second invitation to participate in the hosted service, the second invitation being in the determined language and in the selected second communication format.

18. A non-transitory machine readable medium embodying instructions that, when executed by a machine, allow the machine to perform a method for providing an interactive response system, the method comprising:
providing a hosted service to a plurality of participant devices;
receiving a request from one of the plurality of participant devices to invite an additional device to participate in the hosted service, the request comprising an identifier for identifying a user of the additional device;
determining a language associated with communications of the plurality of participant devices accessing the hosted service;
selecting, based on the identifier, a first communication format, from among a plurality of communication formats, for providing a first communication to the additional device, the first communication format corresponding to a first communication medium used for initiating the first communication with the additional device; and
providing, in the determined language and in the selected communication format, an invitation to participate in the hosted service to the additional device; and
if the first communication fails to be initiated,
selecting, using the one or more computing devices and based on the identifier, a second communication format, from among the plurality of communication formats, for providing a second communication to the additional device, the second communication format corresponding to a second communication medium used for initiating the second communication with the additional device;
providing, to the additional device, the second communication comprising a second invitation to participate in the hosted service, the second invitation being in the determined language and in the selected second communication format.

19. The method of claim 1, wherein the communication medium comprises a phone call, an instant message, or a text message.

20. The method of claim 1, wherein the identifier comprises a telephone number or an instant message identifier of the user.

* * * * *